(12) United States Patent
Brown

(10) Patent No.: US 10,695,590 B1
(45) Date of Patent: Jun. 30, 2020

(54) HITCH-MINDING PULLEYS

(71) Applicant: International Safety Components Ltd, Bangor, Gwynedd (GB)

(72) Inventor: Kevin Brown, Gwynedd (GB)

(73) Assignee: International Safety Components Ltd, Bangor, Gwynedd (GB)

( * ) Notice: Subject to any disclaimer, the term of this patent is extended or adjusted under 35 U.S.C. 154(b) by 0 days.

(21) Appl. No.: 16/261,858

(22) Filed: Jan. 30, 2019

(51) Int. Cl.
*A62B 1/18* (2006.01)
*A62B 1/14* (2006.01)
*F16H 55/50* (2006.01)

(52) U.S. Cl.
CPC ............... *A62B 1/18* (2013.01); *A62B 1/14* (2013.01); *F16H 55/50* (2013.01)

(58) Field of Classification Search
CPC ... B66D 1/42; B66D 1/64; B66D 3/04; B66D 3/08; B66D 3/10; B66D 2700/026; A62B 1/08
USPC .................................................. 254/405, 406
See application file for complete search history.

(56) References Cited

U.S. PATENT DOCUMENTS

| | | | | | |
|---|---|---|---|---|---|
| 2,188,715 | A | * | 1/1940 | Ingram | H02G 1/04 254/134.3 PA |
| 4,892,508 | A | * | 1/1990 | Ryan | B61B 12/06 105/151 |
| 5,217,092 | A | * | 6/1993 | Potter | A62B 1/04 188/65.1 |
| 5,538,224 | A | * | 7/1996 | Powell | B66D 3/04 254/406 |
| 5,845,894 | A | * | 12/1998 | Petzl | A62B 1/14 254/391 |
| 5,927,438 | A | * | 7/1999 | Ostrobrod | A62B 1/08 182/192 |
| 7,673,851 | B2 | * | 3/2010 | Lange | B66D 3/04 254/401 |
| 8,733,739 | B2 | * | 5/2014 | Mauthner | A62B 1/14 254/391 |
| 9,016,431 | B2 | * | 4/2015 | Barnett | A62B 1/14 182/5 |
| 2002/0017428 | A1 | * | 2/2002 | Mauthner | A62B 1/10 182/5 |
| 2003/0034203 | A1 | * | 2/2003 | Hewlett | A62B 1/14 182/5 |
| 2005/0173688 | A1 | * | 8/2005 | Smith | B66D 3/04 254/405 |
| 2006/0191153 | A1 | * | 8/2006 | Thompson | G01B 5/043 33/735 |
| 2006/0207829 | A1 | * | 9/2006 | Mauthner | A62B 1/14 182/5 |
| 2010/0116588 | A1 | * | 5/2010 | Bamberg | A62B 1/14 182/5 |

(Continued)

*Primary Examiner* — Emmanuel M Marcelo
(74) *Attorney, Agent, or Firm* — King & Schickli, PLLC

(57) ABSTRACT

A hitch-minding pulley comprising at least one pulley sheave rotatably fixed between the arms of a split yoke, the arms being swivelable about the rotational axis of the or each pulley sheave to allow access for a pulley engaging climbing rope, the body of the yoke being split into two parts, each body part having a respective yoke arm extending therefrom, the body parts having multiple corresponding pairs of apertures for collectively receiving, in use, a plurality of carabiners, wherein at least one of the pairs of apertures is a curved slot, the outer curvature of which being generally oriented inward towards the or each pulley sheave.

6 Claims, 6 Drawing Sheets

(56) References Cited

U.S. PATENT DOCUMENTS

| | | | |
|---|---|---|---|
| 2011/0232995 A1* | 9/2011 | Rogelja | A62B 1/14 |
| | | | 182/5 |
| 2013/0105251 A1* | 5/2013 | Baum | A62B 1/08 |
| | | | 188/65.2 |
| 2013/0180800 A1* | 7/2013 | Mauthner | A62B 1/14 |
| | | | 182/5 |
| 2014/0262611 A1* | 9/2014 | Oddou | A62B 1/14 |
| | | | 182/5 |
| 2016/0107005 A1* | 4/2016 | Rogelja | A62B 1/14 |
| | | | 182/5 |
| 2016/0130875 A1* | 5/2016 | Hwang | A62B 1/14 |
| | | | 182/5 |
| 2018/0021602 A1* | 1/2018 | Rogelja | A62B 1/14 |
| | | | 188/65.2 |
| 2018/0193702 A1* | 7/2018 | Petrov | A62B 35/0075 |
| 2019/0314650 A1* | 10/2019 | Cowell | B66D 1/7489 |

* cited by examiner

HITCH-MINDING PULLEYS

This invention relates to hitch-minding pulleys as used in, inter alia, climbing activities such as mountaineering or tree surgery in which the pulley is used as an anchor point for, for example, a climbing harness hitched to it allowing the climber to ascend or descend via a climbing rope.

BACKGROUND OF THE INVENTION

Hitch-minding pulleys of the aforesaid type generally comprise a pair of yoke arms mounted on opposite sides of a rotatable rope sheave or roller allowing the rope to smoothly roll thereover in use during climbing activities. Each yoke arm is swivelable relative to the other in order to allow a rope to be part-wound onto the pulley roller and includes two or more circular apertures, each for receiving in combination with a corresponding aperture on the other yoke arm a respective carabiner, which may typically be connected to a climbing harness or climbing equipment such as a rope wrench. Where multiple circular apertures are provided, they are therefore suitable for distributing tensile loads borne by the pulley in proportion to the tensile force acting on each circular aperture. As a consequence, frictional losses occur where there is an imbalance caused by varying magnitude of loads borne by each respective circular aperture and varying angular direction of such loads during climbing. Accordingly, the angular position of the circular apertures relative to each other and the or each pulley sheave is necessarily a compromise based on experience of typical load values being carried by the pulley during climbing activities and typical changes to the position of the or each load relative to the rope as it passes through the pulley or due to differing physical characteristics as between one climber and another, such as the difference between the position of the chest harness attachment point and the seat harness attachment point which occurs when climbers of different size use the same equipment.

SUMMARY OF THE INVENTION

The present invention is derived from the realisation that the efficiency of hitch-minding pulleys of the type described above can be improved by adopting an alternative configuration which allows for continuously variable adjustment of the angular position between respective load-bearing carabiners attached to the pulley, thereby reducing frictional losses by automatically compensating for differences in the size and weight of climbers using such equipment.

According to the invention there is provided a hitch-minding pulley comprising at least one pulley sheave rotatably fixed between the arms of a split yoke, the arms being swivelable about the rotational axis of the or each pulley sheave to allow access for a pulley engaging climbing rope, the stem of the yoke being longitudinally split into two parts, each stem part having a respective yoke arm extending therefrom, the stem parts having multiple corresponding pairs of apertures for collectively receiving, in use, a plurality of carabiners, wherein at least one of the pairs of apertures is a curved slot, the outer curvature of which being generally oriented inward towards the or each pulley sheave.

Preferably, the curved slot is substantially kidney-shaped, having respectively inner and outer curved surfaces, the outer curved surface of the slot providing a bearing surface over which a carabiner can slide when attached thereto. In an alternative arrangement the multiple corresponding pairs of apertures are all curved inwardly towards the or each pulley sheave.

With the foregoing arrangement, it is found that irrespective of the physical size or shape of the climber, the ability of the carabiner occupying the or each curved slot to slide therewithin allows it to occupy the least torsional, and therefore most frictionally efficient, position under tension, rather than occupying a fixed position as described in the prior art. In the case of the latter, the tensile forces are generally indirectly transmitted between the or each sheave as a consequence of the position of fixed circular apertures because they are located at positions corresponding to an average between a range of possible positions, each ideally suited to climbers of particular physical characteristics different from other climbers who may use the same equipment, rather than along the axis formed between the point of force equilibrium of the pulley and the load applied. In contrast, the hitch-minding pulley of the invention automatically adopts the least torsional and hence most frictionally efficient position for the carabiners, thereby avoiding frictional losses caused by any indirect or off-axis connection with the climber which would necessarily induce an orthogonal force component on the pulley arrangement, making it more physically demanding when the climber is ascending. Accordingly, in the arrangement of the invention the axis of force between the load and point of contact with the or each curved aperture is substantially in line with the axis of the transferred force between the point of contact with the curved aperture and the point of equilibrium of the forces acting on the pulley, thereby minimizing any newly induced force orthogonal to that axis at the point of contact with the or each curved aperture and concomitant moment or torsional force on the pulley sheave arrangement.

BRIEF DESCRIPTION OF THE DRAWINGS

The invention will now be described, by way of example only, with reference to the accompanying drawings, in which.

DETAILED DESCRIPTION OF THE DRAWINGS

Figure 1:
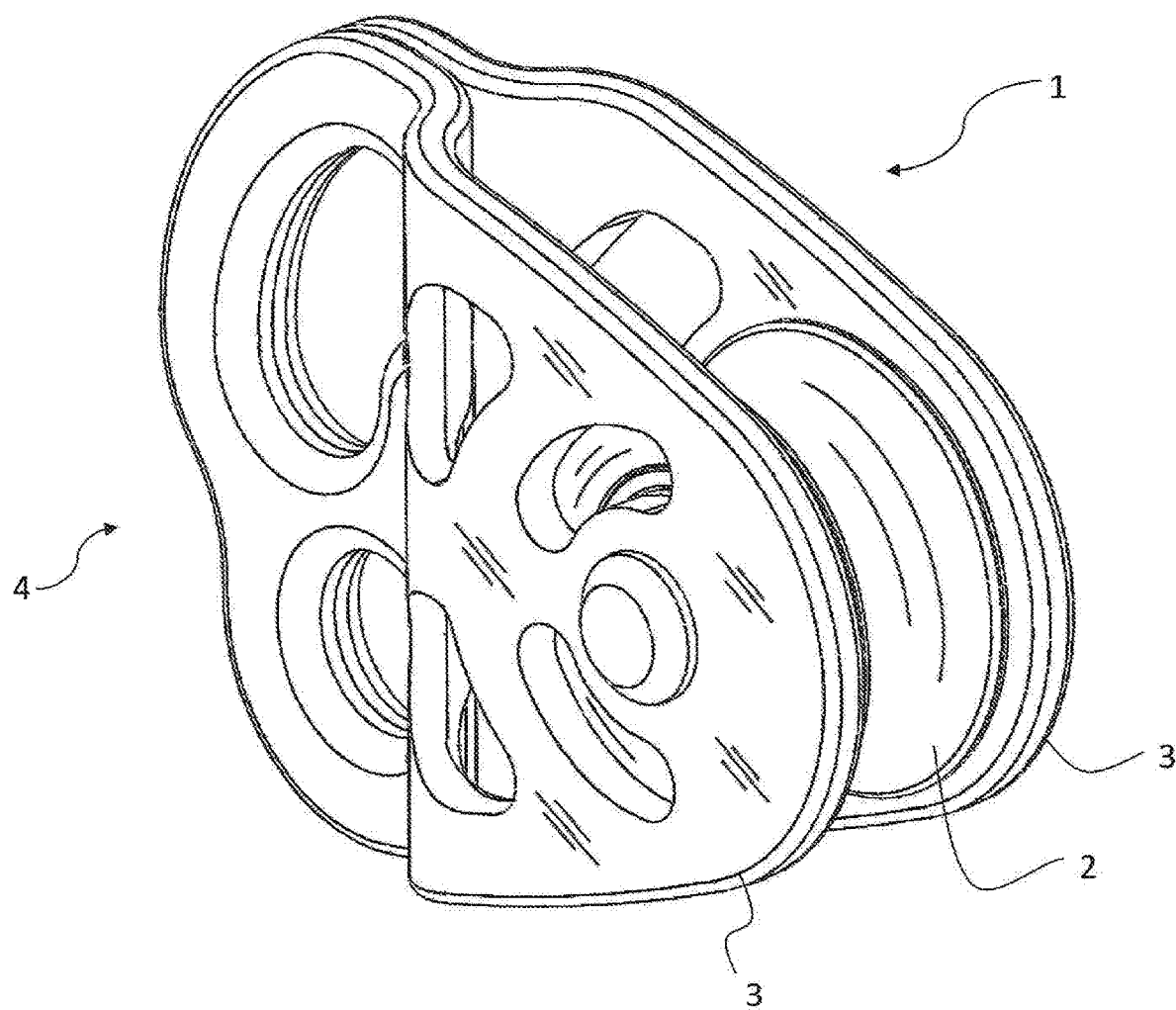
FIG. 1 is a perspective view of one side of a hitch-minding pulley of the invention.
Figure 2:
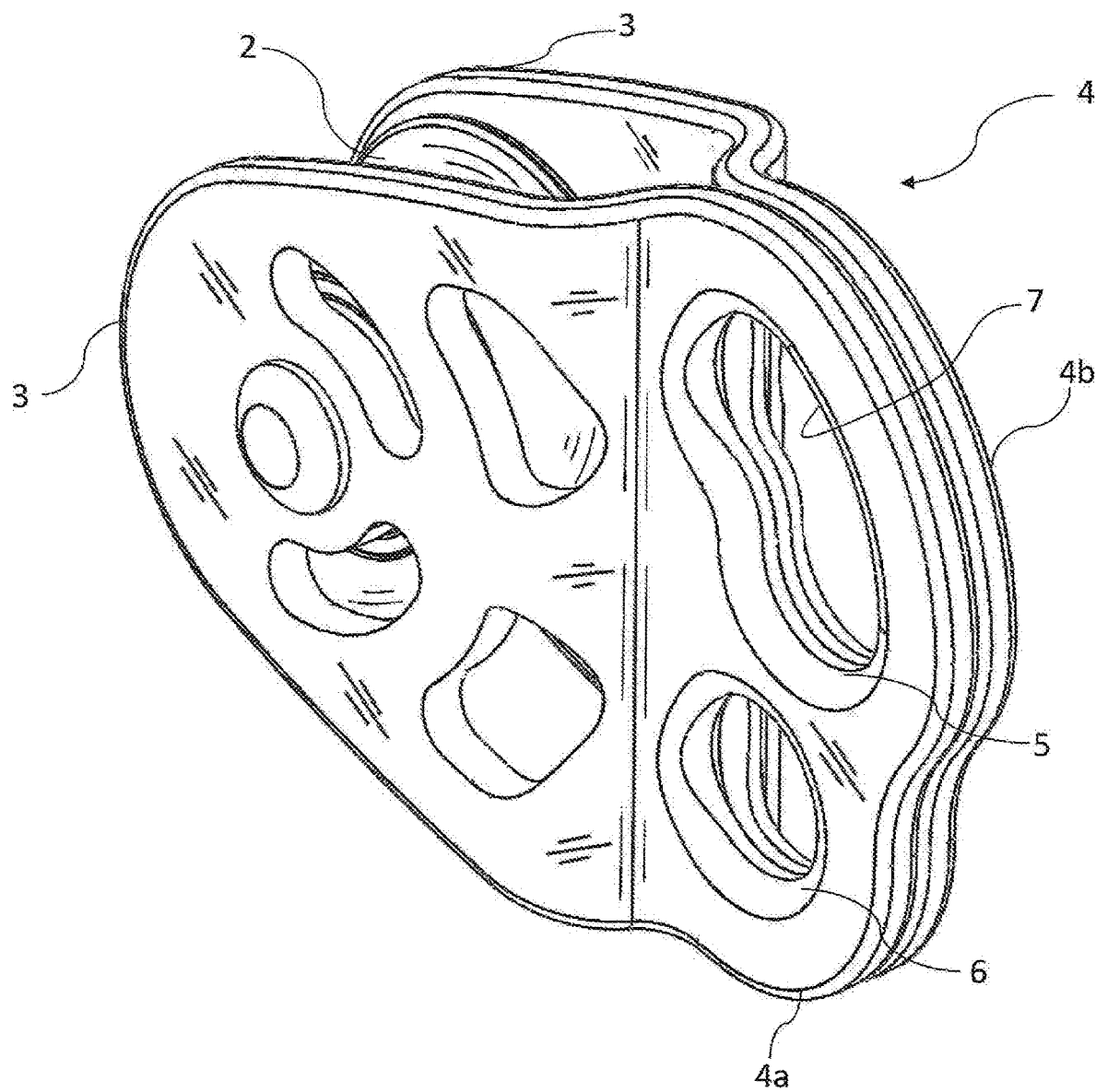
FIG. 2 is a perspective view of the other side of the pulley of FIG. 1.

Turning firstly to FIGS. 1 to 4 there is shown a hitch-minding pulley 1 comprising a pulley wheel or sheave 2 rotatably mounted between a pair of yoke arms 3 extending from a yoke stem 4. The yoke stem 4 is split into correspondingly shaped yoke stem parts or halves 4a, 4b which, in use, normally occupy the position shown but can be swiveled relative to each other about the axis of rotation of the pulley wheel 2 in order to provide engagement onto the outer surface of the pulley wheel 2 of a climbing rope in a manner well known in the art.

Figure 3:
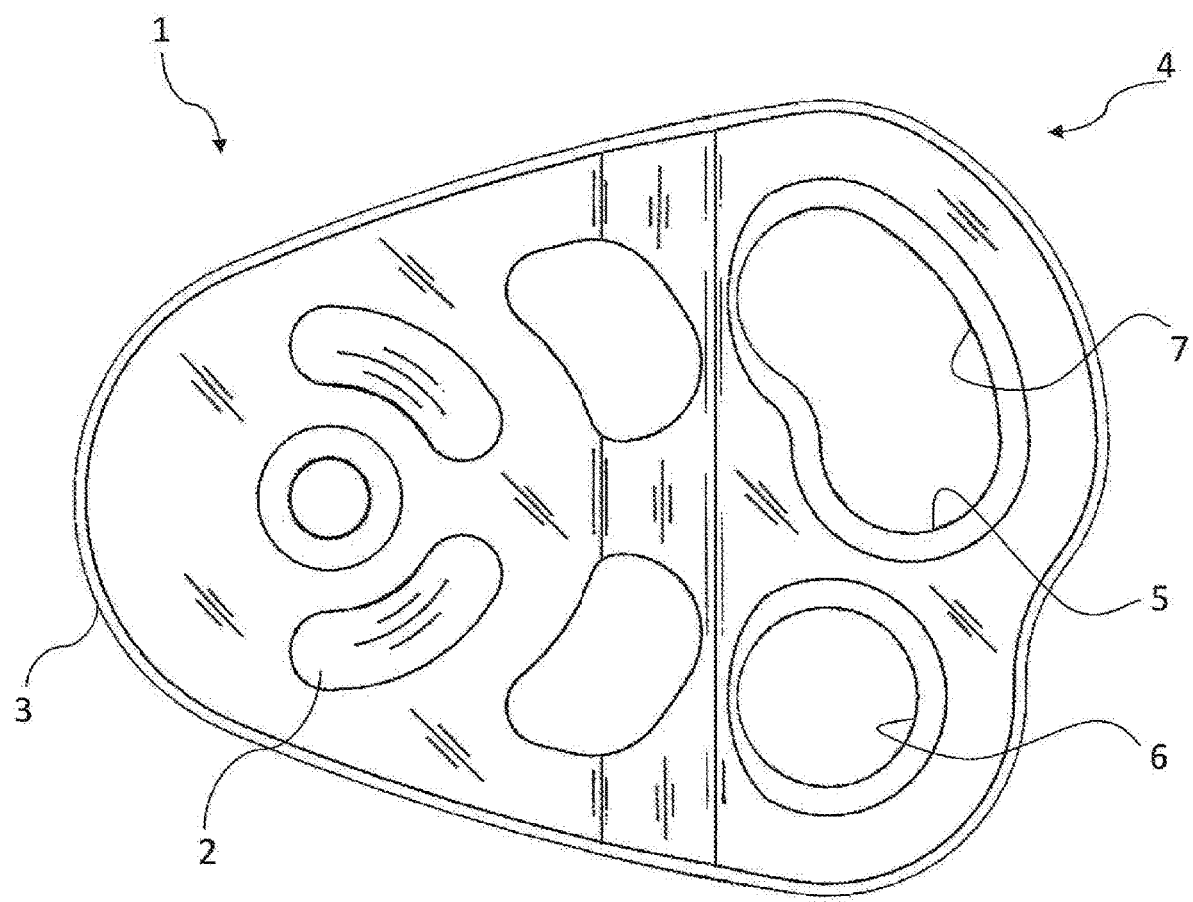
FIG. 3 is a side view of the pulley of FIG. 1.
Figure 4:
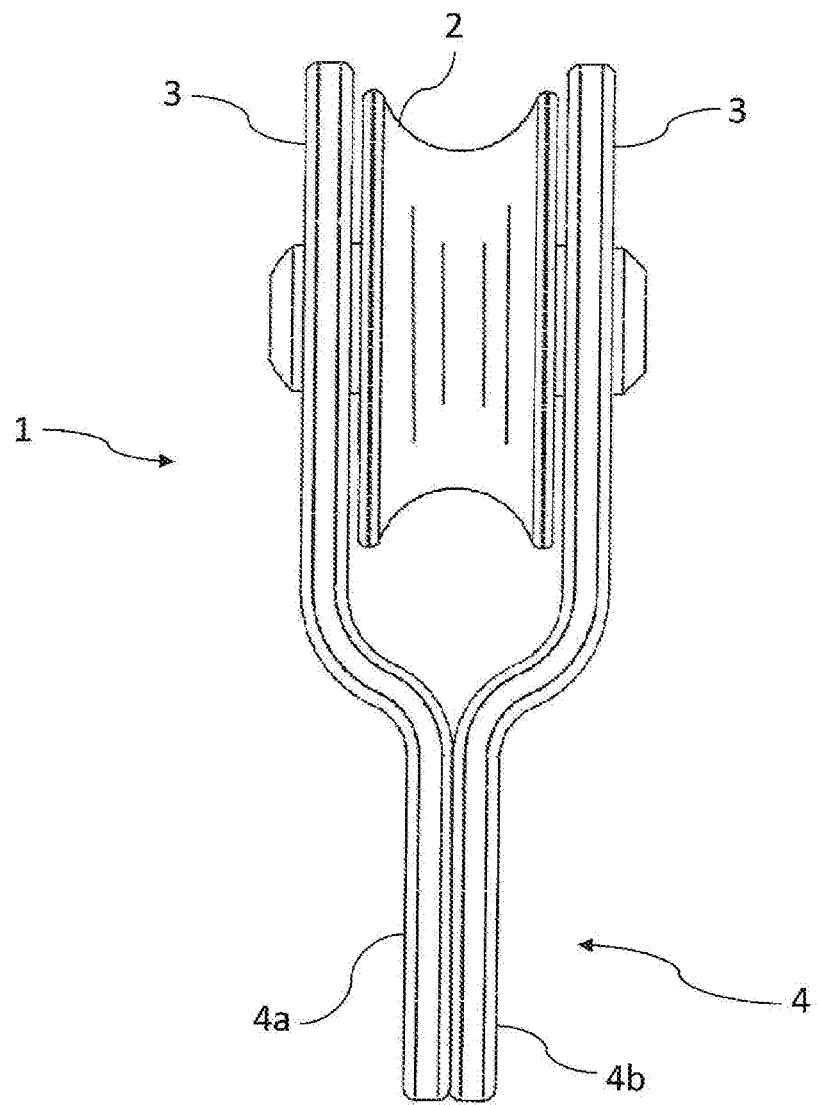
FIG. 4 is an end view of the pulley of FIG. 1.

As is seen more clearly with reference to FIG. 3, the yoke stem 4 includes a pair of apertures 5, 6 for receiving respective carabiners (not shown), aperture 5 being generally curved or kidney-shaped and aperture 6 being circular, corresponding to conventional such apertures used in the art. The kidney-shaped aperture 5 has a curved bearing surface 7 along which a carabiner may slide when secured thereto. In contrast, the circular aperture 6 only permits a carabiner to swivel therewithin, therefore representing a single fixed connection point as compared to the variable connection points available via the kidney-shaped aperture 5.

Figure 5:
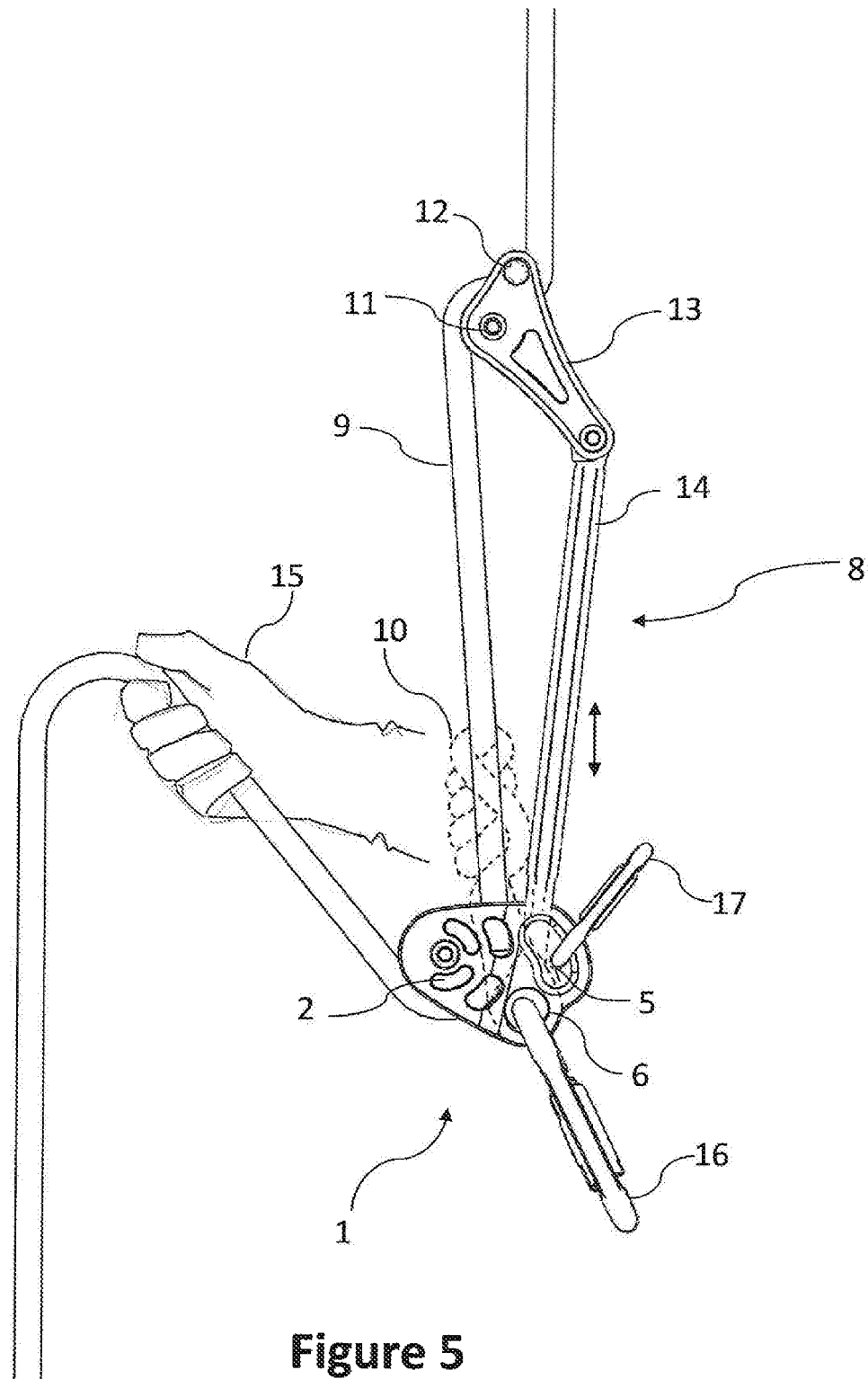
FIG. 5 is a schematic view of the pulley of FIG. 1 as used in conjunction with a rope wrench.

In FIG. 5 it will be seen that the hitch-minding pulley 1 is being used in conjunction with a conventional rope wrench 8. A climbing rope 9 extends from the pulley wheel 2 of the hitch-minding pulley 1 partially around a conventional Prusik knot 10 to a rope wrench pulley wheel 11, from where the rope 9 travels over an off-set guide roller 12, the pulley wheel 11 and guide roller 12 being located at one end of a lever arm 13 pivotally attached to an operating handle 14 connected at its lower end to the hitch-minding pulley 1, the arrangement thereby permitting the hand 15 of a climber to relatively easily pull the lower, free end of the rope 9 away from the hitch-minding pulley 1 in a step-wise manner by which the climber can gradually ascend, with uncontrolled downward movement of the climber being prevented by the presence of the Prusik knot 10. In this arrangement it will be seen that the hitch-minding pulley 1 is connected to a pair of carabiners 16, 17, the lowermost carabiner 16 being attached to the circular aperture 6 about which it is constrained to pivot, whereas the uppermost carabiner 17 is attached to the kidney-shaped curved slot 5, along which it is constrained to slide along the curved bearing surface 7 as shown more clearly in FIG. 3. In practice, the lowermost carabiner 16 is typically connected to the seat harness (not shown) of the climber and the uppermost carabiner 17 is connected to the chest harness (not shown) of the climber, the arrangement therefore allowing self-adjustment of the position of the uppermost carabiner 17 to its most efficient position.

Figure 6:
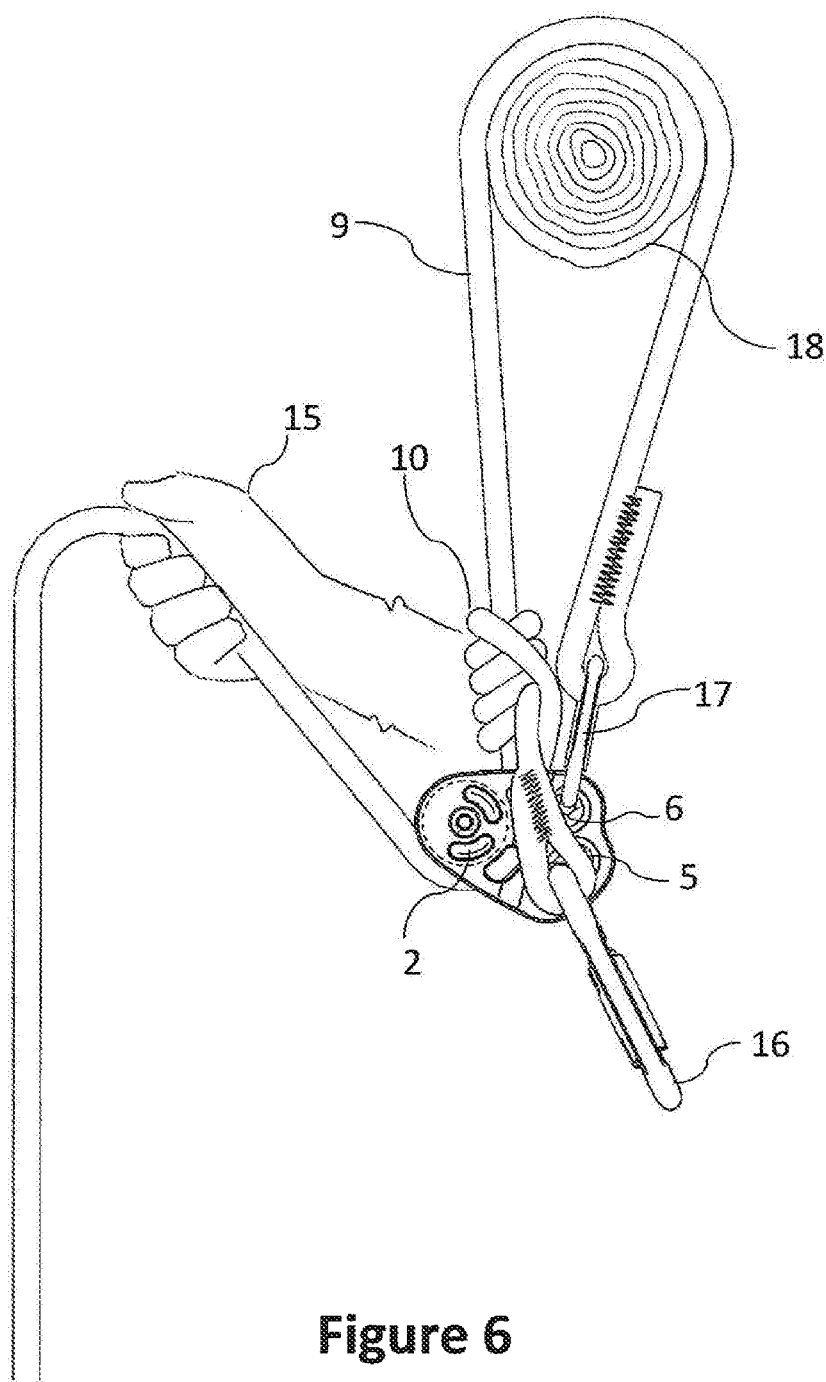
FIG. 6 is a schematic view of the pulley of FIG. 1 in use below the branch of a tree.

In FIG. 6 it will be seen that the hitch-minding pulley 1 is being used below the branch 18 of a tree (not otherwise shown) in an opposite configuration to that shown with reference to FIG. 5 in which the circular aperture 6 is now top-most and directly connected to the carabiner 17, the carabiner 17 being connected to the looped end of the rope 9, the rope 9 extending around the branch 18 and down into the hitch-minding pulley 1, from where it exits via the pulley wheel 2 to the outstretched hand 15 of the climber. The lower-most carabiner 16 is received at its upper end within the curved aperture 5 and receives at its lower end a connection to a seat harness (not shown) for the climber. Once again, it will be seen that, under load, the angular position of the carabiner 16 automatically adjusts itself to the most frictionally efficient point.

FIGS. 5 and 6 show respectively different ways of using the hitch-minding pulley 1 of the invention where, in each case, the kidney-shaped curved aperture 5 allows a load-bearing carabiner attached thereto to assume, in use, the most frictionally efficient position, having regard to the size and shape of the climber using the equipment. However, it has also been found that a further benefit of the hitch-minding pulley 1 having a curved aperture 5 is that it is large enough to accommodate two or possibly three conventional carabiners if necessary. A still further benefit is that the curved aperture 5 is also large enough to accommodate over-sized carabiners such as carabiners incorporating pulley wheels which are otherwise too large to be attached to a circular aperture in a conventional hitch-minding pulley.

The invention in its various applications therefore provides an elegantly simple solution to the disadvantages pertaining to the use of conventional hitch-minding pulleys with fixed point circular apertures which generally prevent the hitch-minding pulley from adopting the most frictionally efficient configuration relative to the various loads being applied to it.

The invention claimed is:

1. A hitch-minding pulley comprising at least one pulley sheave rotatably fixed between arms of a split yoke, the arms being swivelable about the rotational axis of the at least one pulley sheave to allow access for a pulley engaging climbing rope, a stem of the yoke being longitudinally split into two parts, each stem part having a respective yoke arm extending therefrom, the stem parts having multiple corresponding pairs of apertures for collectively receiving, in use, a plurality of carabiners, wherein at least one of the pairs of apertures is a curved slot, an outer curvature of which, being a bearing surface over which a carabiner can slide when attached thereto, is generally oriented inward towards the at least one pulley sheave.

2. A hitch-minding pulley according to claim 1 wherein the curved slot is substantially kidney-shaped, having respectively inner and outer curved surfaces.

3. A hitch-minding pulley according to claim 1 wherein the corresponding pairs of apertures in the yoke stem are all curved slots with an outer curvature of each of which being generally oriented inward towards the at least one pulley sheave.

4. A hitch-minding pulley according to claim 1, wherein at least one of the pairs of apertures is circular.

5. A hitch-minding pulley comprising at least one pulley sheave rotatably fixed between arms of a split yoke, the arms being swivelable about the rotational axis of the at least one pulley sheave to allow access for a pulley engaging climbing rope, a stem of the yoke being longitudinally split into two parts, each stem part having a respective yoke arm extending therefrom, the stem parts having multiple corresponding pairs of apertures which are aligned such that the pairs of apertures are not obstructed by the at least one pulley sheave, wherein at least one of the pairs of apertures is a curved slot, an outer curvature of which, being a bearing surface over which a carabiner can slide when attached thereto, is generally oriented inward towards the at least one pulley sheave.

6. A hitch-minding pulley comprising at least one pulley sheave rotatably fixed between arms of a split yoke, the arms being swivelable about the rotational axis of the at least one pulley sheave to allow access for a pulley engaging climbing rope, a stem of the yoke being longitudinally split into two parts, each stem part having a respective yoke arm extending therefrom, the stem parts having multiple corresponding pairs of apertures, and at least one carabiner for engaging at least one of the pairs of apertures, wherein at least one of the pairs of apertures is a curved slot, an outer curvature of which, being a bearing surface over which a carabiner can slide when attached thereto, is generally oriented inward towards the at least one pulley sheave.

* * * * *